(12) United States Patent
Huang et al.

(10) Patent No.: US 10,509,308 B1
(45) Date of Patent: Dec. 17, 2019

(54) COMPUTING DEVICE AND INPUT DEVICE THEREOF

(71) Applicant: Primax Electronics Ltd., Taipei (TW)

(72) Inventors: Wei-Chiang Huang, Taipei (TW); Chung-Yuan Chen, Taipei (TW); Chuan-Tai Hsiao, Taipei (TW); Ming-Hui Yeh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/143,444

(22) Filed: Sep. 26, 2018

(30) Foreign Application Priority Data

Jun. 29, 2018 (TW) .............................. 107122636 A

(51) Int. Cl.
*G03B 21/14* (2006.01)
*G03B 29/00* (2006.01)
*G06F 1/16* (2006.01)
*G06F 3/02* (2006.01)
*G06F 3/0354* (2013.01)

(52) U.S. Cl.
CPC ........... *G03B 29/00* (2013.01); *G03B 21/145* (2013.01); *G06F 1/1656* (2013.01); *G06F 3/0202* (2013.01); *G06F 3/03543* (2013.01)

(58) Field of Classification Search
CPC . G03B 21/145; G03B 21/208; G03B 21/2013
See application file for complete search history.

(56) References Cited

U.S. PATENT DOCUMENTS

| | | | | |
|---|---|---|---|---|
| 8,297,758 | B2 * | 10/2012 | Choi | G06F 1/1626 353/10 |
| 8,690,337 | B2 * | 4/2014 | Nishigaki | G06F 3/0423 345/30 |
| 2010/0296066 | A1 * | 11/2010 | Ou Yang | F21V 14/06 353/119 |
| 2011/0013147 | A1 * | 1/2011 | LaDuke | G03B 21/14 353/28 |
| 2017/0371426 | A1 * | 12/2017 | Ano | G06F 3/03545 |

* cited by examiner

*Primary Examiner* — Sultan Chowdhury
(74) *Attorney, Agent, or Firm* — Kirton McConkie; Evan R. Witt

(57) ABSTRACT

A computing device and an input device are provided. Each of the computing device and the input device includes a control unit, a light source, a projection plate and a casing. The control unit, the light source and the projection plate are accommodated within the casing. The light source emits light beams. The projection plate includes a pattern. After the light beams pass through the projection plate, the light beams are projected outside the casing and an image corresponding to the pattern of the projection plate is formed on a projection surface that is located outside the casing. Since the projection plate is cheap and small, the fabricating cost of the computing device or the input device is reduced and the purpose of developing the computing device or the input device toward light weightiness, slimness and small size is achievable.

17 Claims, 9 Drawing Sheets

COMPUTING DEVICE AND INPUT DEVICE THEREOF

FIELD OF THE INVENTION

The present invention relates to a computing device and an input device, and more particularly to a computing device and an input device with a projecting function.

BACKGROUND OF THE INVENTION

In the information age, most people rely on the help of computers to complete their tasks in order to work efficiently. The common input device of a computer includes for example a mouse device, a keyboard device, a trackball device, or the like. Moreover, for increasing the application and entertainment, an input device with a projecting function has been introduced into the market.

Please refer to FIGS. 1 and 2. FIG. 1 is a schematic perspective view illustrating the outward appearance of a conventional mouse device. FIG. 2 schematically illustrates the concepts of the projecting function of the mouse device as shown in FIG. 1. The conventional mouse device 1 comprises a casing 11, left/right buttons 12, a LCD panel 13, a microcontroller (not shown), a magnifying lens 14, a projection light source 15 and a light-transmissible projection panel 16. The left/right buttons 12 are exposed outside the casing 11 so as to be operated by the user. The microcontroller, the LCD panel 13 and the projection light source 15 are accommodated within the casing 11. Moreover, the microcontroller is electrically connected with the LCD panel 13. The light-transmissible projection panel 16 is installed on the casing 11 and located at a focusing position of the magnifying lens 14. The image shown on the LCD panel 13 is controlled by the microcontroller. The projection light source 15 emits a light beam to the LCD panel 13. When the associated information is shown on the LCD panel 13 under control of the microcontroller and in response to the light beam from the projection light source 15, the image shown on the LCD panel 13 is enlarged by the magnifying lens 14. The enlarged image is projected onto the light-transmissible projection panel 16 so as to be viewed by the user. The technology of the mouse device 1 is disclosed in Taiwanese Utility Model No. TWM385747, which is entitled "Projection mouse" and detailed descriptions thereof are omitted.

As mentioned above, the input device is equipped with the LCD panel to provide the projecting function. However, the installation of the LCD panel increases the fabricating cost of the input device. Moreover, the bulky volume of the LCD panel is detrimental to the development of the input device toward light weightiness, slimness and small size. In other words, the conventional input device with the projecting function needs to be further improved. Moreover, the computing device with the projecting function has not been disclosed.

SUMMARY OF THE INVENTION

An object of the present invention provides a computing device and an input device with the projecting function. Each of the computing device and the input device includes a light source and a projection plate. Since the projection plate is cheap and small, the fabricating cost of the computing device or the input device is reduced and the purpose of developing the computing device or the input device toward light weightiness, slimness and small size is achievable.

In accordance with an aspect of the present invention, there is provided an input device. The input device includes a control unit, a light source, a projection plate and a casing. The control unit is in communication with a computing device. When the input device is operated by a user, the control unit generates a control signal to the computing device. The light source emits plural light beams. The projection plate includes a pattern. The control unit, the light source and the projection plate are accommodated within the casing. After the plural light beams are transmitted through the projection plate, an image corresponding to the pattern is projected outside the casing and formed on a projection surface that is located outside the casing.

In accordance with another aspect of the present invention, there is provided a computing device. The computing device includes a control unit, a light source, a projection plate and a casing. When the computing device is operated by a user, the control unit generates a control unit to the computing device. The light source emits plural light beams. The projection plate includes a pattern. The control unit, the light source and the projection plate are accommodated within the casing. After the plural light beams are transmitted through the projection plate, an image corresponding to the pattern is projected outside the casing and formed on a projection surface that is located outside the casing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
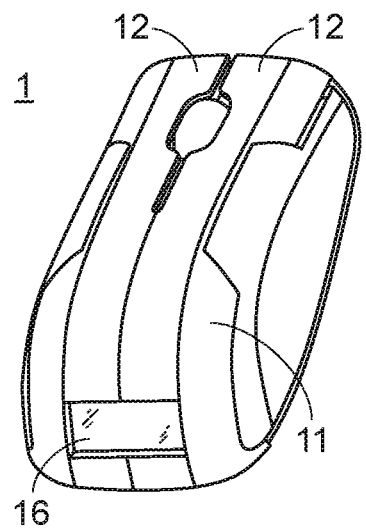
FIG. 1 is a schematic perspective view illustrating the outward appearance of a conventional mouse device.
Figure 2:
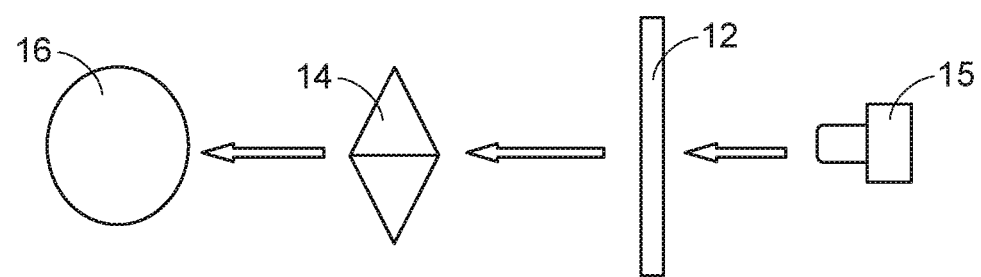
FIG. 2 schematically illustrates the concepts of the projecting function of the mouse device as shown in FIG. 1.
Figure 3:
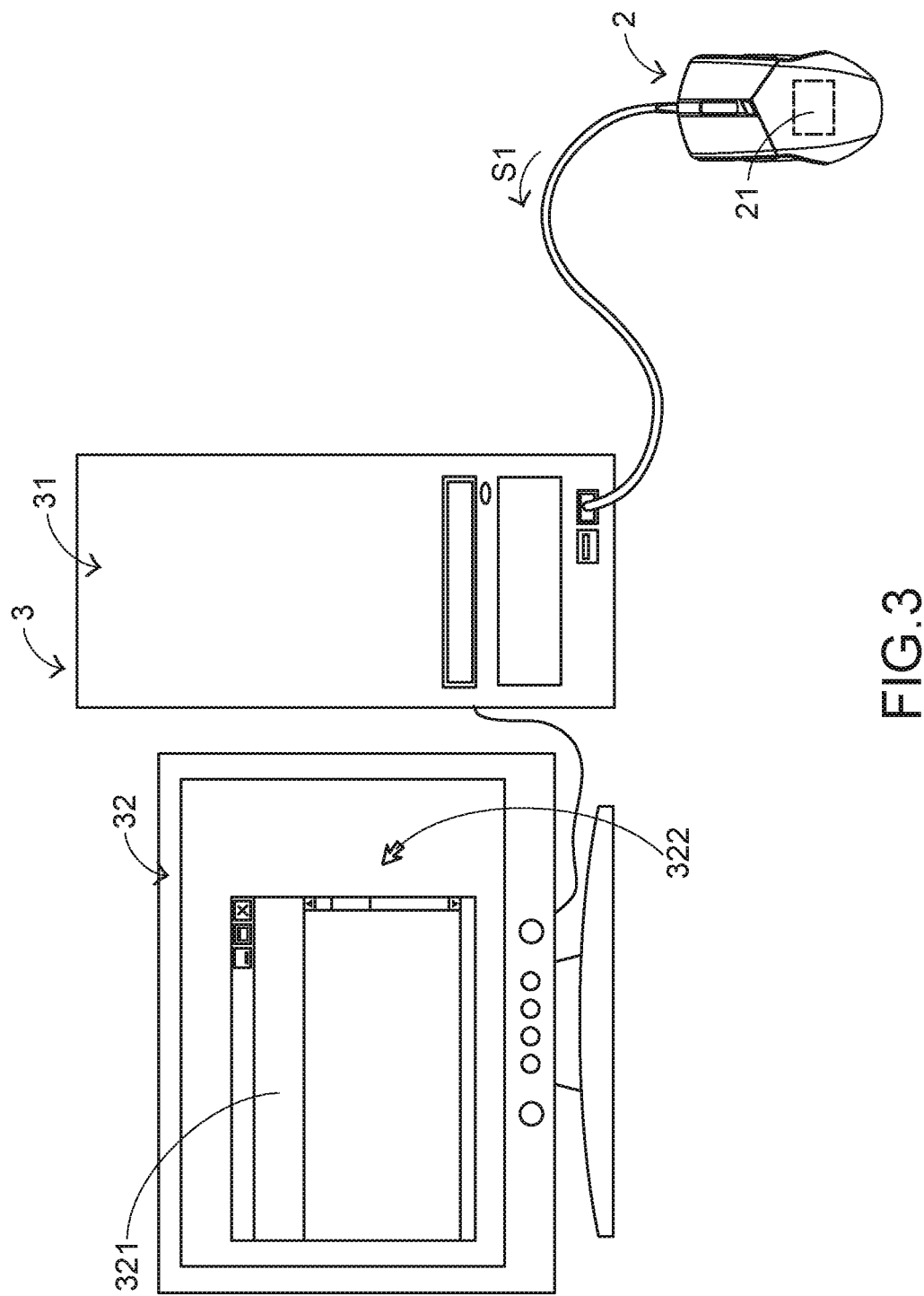
FIG. 3 is a schematic perspective view illustrating the outward appearance of an input device according to a first embodiment of the present invention.

FIG. 3 is a schematic perspective view illustrating the outward appearance of an input device according to a first embodiment of the present invention. In this embodiment, the input device is a mouse device 2. The mouse device 2 comprises a control unit 21. A computing device 3 is also shown in FIG. 3. The computing device 3 comprises a host 31 and a monitor 32. The mouse device 2 is connected with the host 31, and thus the control unit 21 is in communication with the host 31. In FIG. 3, the mouse device 2 is connected with the host 31 in a wired transmission manner. Alternatively, the mouse device is connected with the host in a wireless transmission manner. A cursor 322 and a graphic-based window 321 are displayed on the monitor 32. When the user's palm holds the mouse device 2 to operate the mouse device 2, the control unit 21 generates a control signal S2 to the host 31 according to the displacement amount of the mouse device 2. According to the control signal S2, the cursor 322 shown on the monitor 32 is correspondingly moved.

Figure 4:
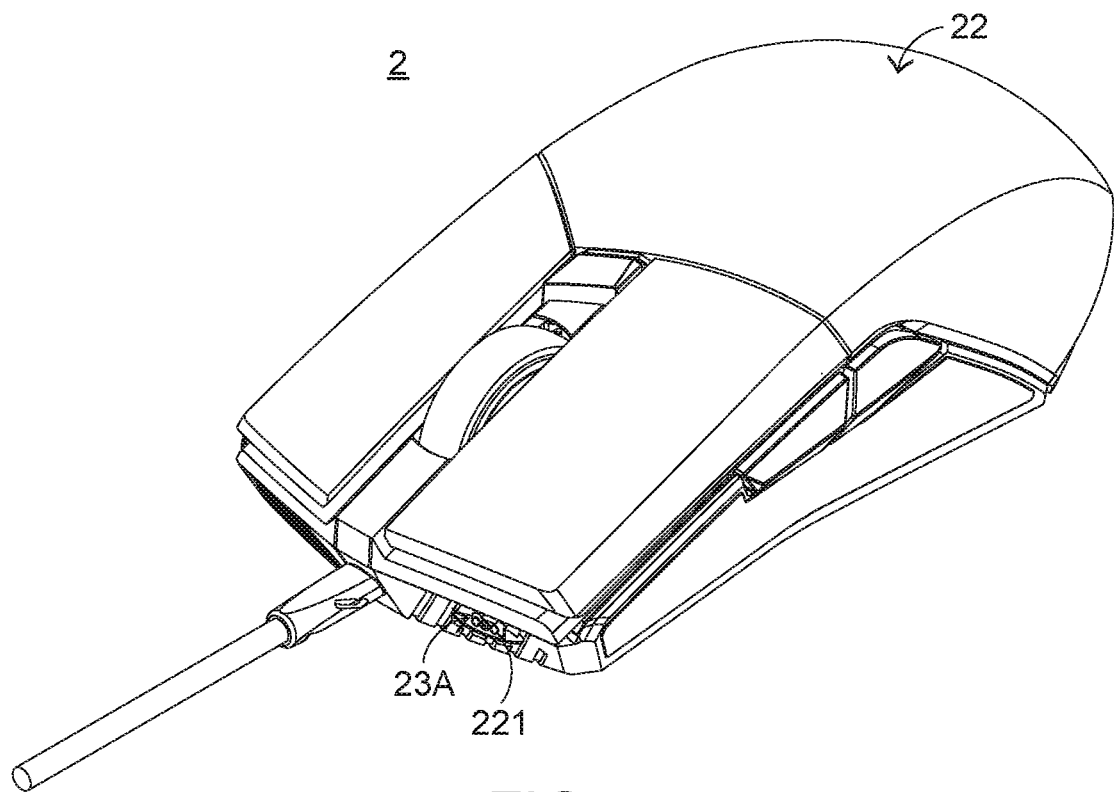
FIG. 4 is a schematic perspective view illustrating the outward appearance of the input device as shown in FIG. 3 and taken along another viewpoint.
Figure 5:
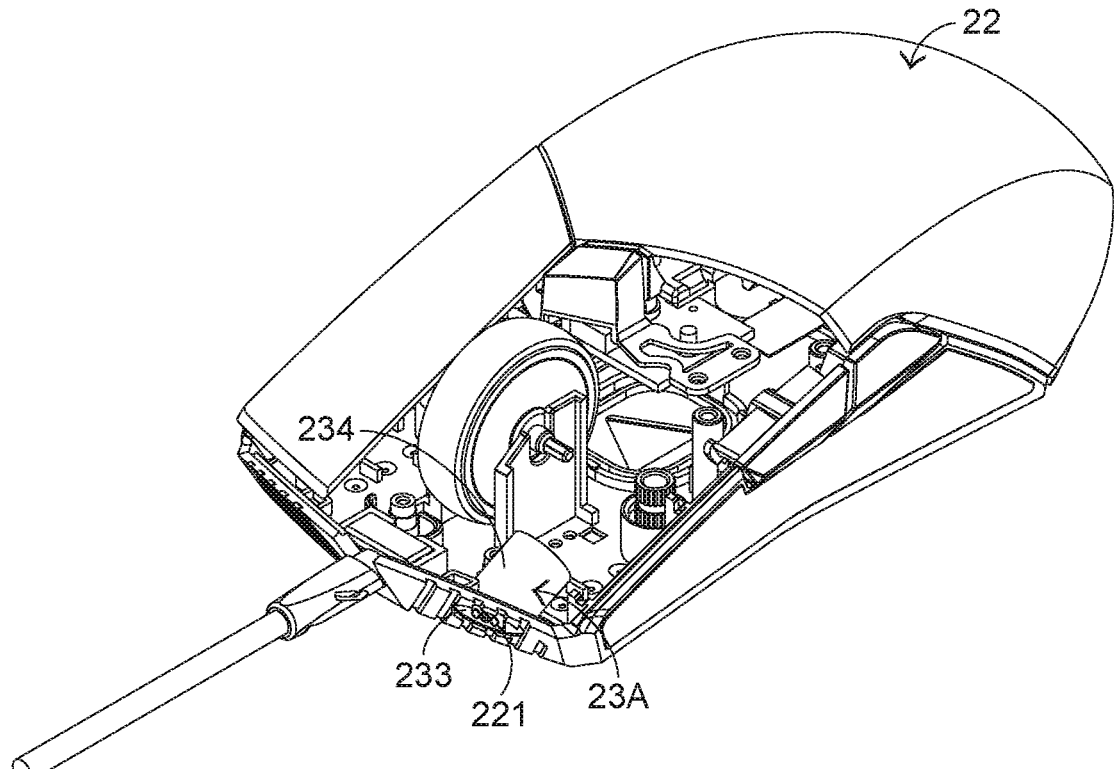
FIG. 5 is a schematic perspective view illustrating the structure of a portion of the input device as shown in FIG. 4.
Figure 6:
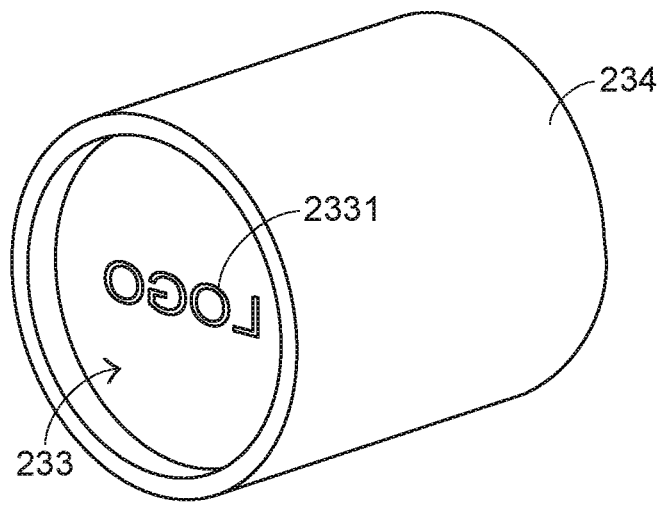
FIG. 6 is a schematic perspective view illustrating the projection module of the input device as shown in FIG. 5.
Figure 7:
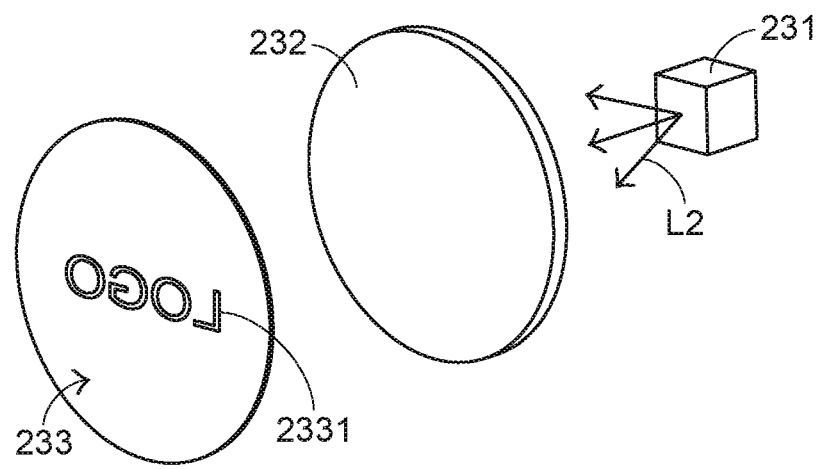
FIG. 7 is a schematic exploded view illustrating a portion of the projection module of the input device as shown in FIG. 6.

Please refer to FIGS. 4, 5, 6 and 7. FIG. 4 is a schematic perspective view illustrating the outward appearance of the input device as shown in FIG. 3 and taken along another viewpoint. FIG. 5 is a schematic perspective view illustrating the structure of a portion of the input device as shown in FIG. 4. FIG. 6 is a schematic perspective view illustrating the projection module of the input device as shown in FIG. 5. FIG. 7 is a schematic exploded view illustrating a portion of the projection module of the input device as shown in FIG. 6. The mouse device 2 further comprises a casing 22 and a projection module 23A. The control unit 21 and the projection module 23A are accommodated within the casing 22. The casing 22 comprises a light-transmissible part 221 corresponding to the projection module 23A. Preferably but not exclusively, the light-transmissible part 221 is a perforation or a transparent structure for allowing the light beam to pass through.

In this embodiment, the projection module 23A comprises a light source 231, a first lens 232, a projection plate 233 and a fixing element 234. The first lens 232 is arranged between the light source 231 and the projection plate 233. The fixing element 234 is used for fixing the first lens 232 and the projection plate 233. The light source 231 emits plural light beams L2. When the light beams L2 outputted from the light source 231 pass through the first lens 232, the travelling directions of at least portions of the light beams L2 are changed. In an embodiment, the first lens 232 is a concave-convex lens or a plano-convex lens, and the fixing element 234 is a sleeve for fixing the first lens 232 and the projection plate 233 therein. It is noted that the type of the first lens 232, the type of the fixing element 234 and the way of fixing the first lens 232 and the projection plate 233 are not restricted.

The projection plate 233 has a pattern 2331. For example, the projection plate 233 is a film. The pattern 2331 on the projection plate 233 indicates the information to be displayed (e.g., a logo). The pattern 2331 is formed on the film through a printing process or a developing process. The way of forming the pattern 2331 is well known to those skilled in the art, and is not redundantly described herein.

Figure 8:
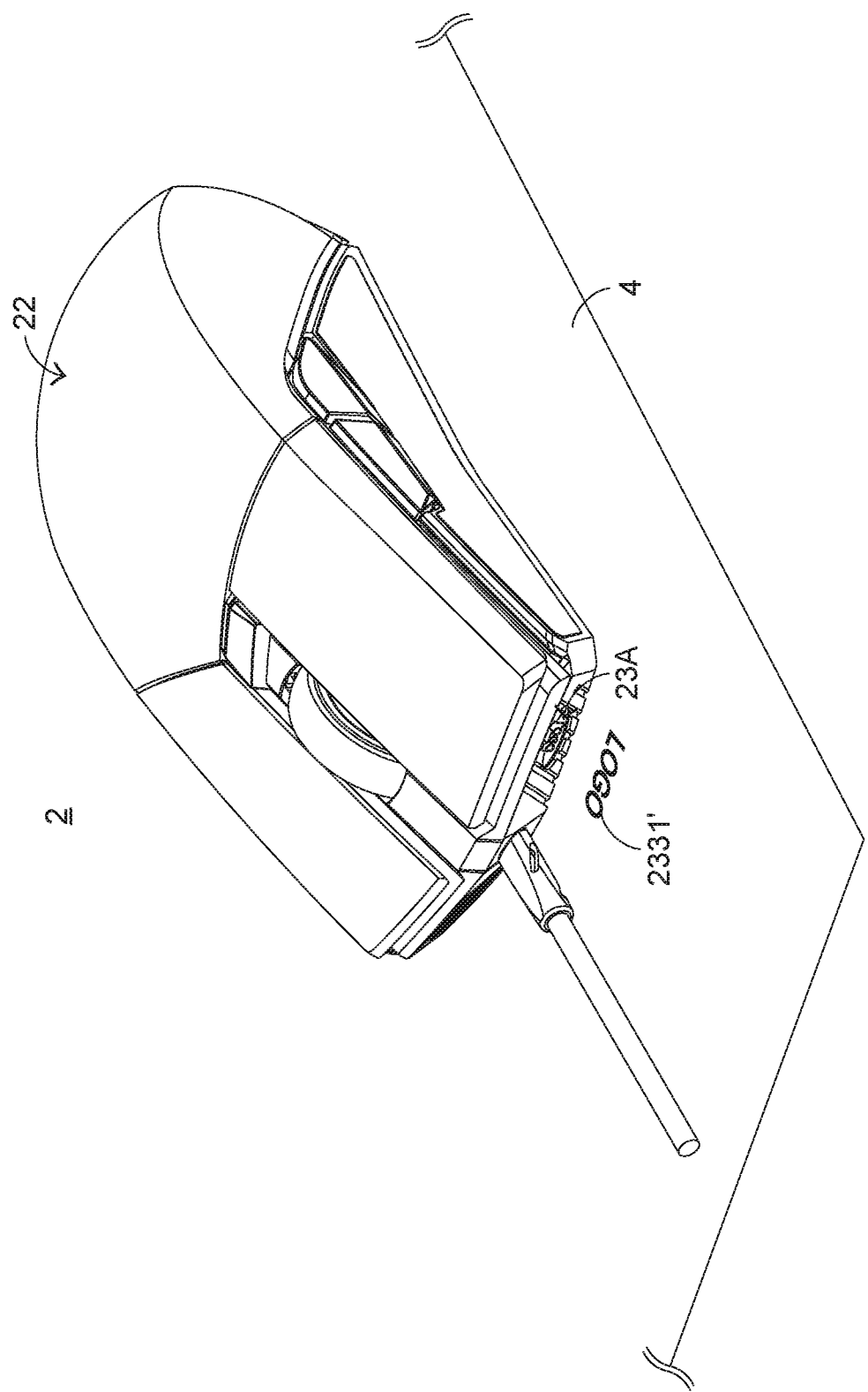
FIG. 8 schematically illustrating the projecting concept of the mouse device as shown in FIG. 4.

The projecting operations of the mouse device 2 will be described as follows. FIG. 8 schematically illustrating the projecting concept of the mouse device as shown in FIG. 4. After the light beams L2 outputted from the light source 231 pass through the first lens 232, the light beams L2 pass through the projection plate 233. After the light beams L2 pass through the projection plate 233, the light beams L2 are projected outside the casing 22. Consequently, the image 2331' corresponding to the pattern 2331 is formed on a projection surface 4 that is located outside the casing 22. Preferably but not exclusively, the projection surface 4 is a desk surface where the mouse device 2 is placed.

The focal distance, the size of the image 2331' on the projection surface 4 or any other appropriate image effect may be determined according to the optical data of the first lens 232 and/or the distance relationship between the first lens 232, the projection plate 233 and the light source 231. The distance relationship between the first lens 232, the projection plate 233 and the light source 231 may be specially designed by those skilled in the art according to the practical requirements.

Figure 9:
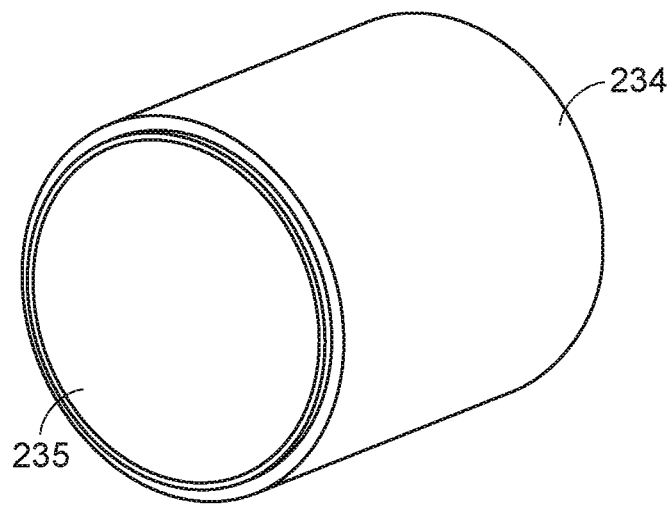
FIG. 9 is a schematic perspective view illustrating a projection module of an input device according to a second embodiment of the present invention.
Figure 10:
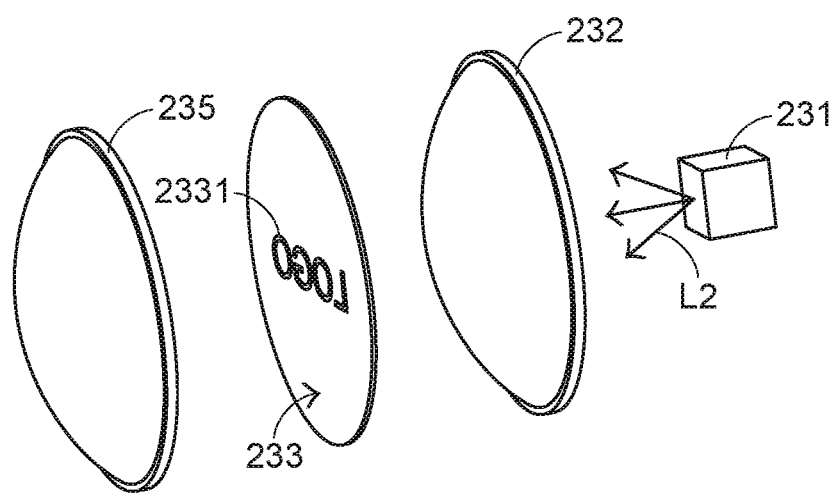
FIG. 10 is a schematic exploded view illustrating a portion of the projection module of the input device as shown in FIG. 9.

Please refer to FIGS. 9 and 10. FIG. 9 is a schematic perspective view illustrating a projection module of an input device according to a second embodiment of the present invention. FIG. 10 is a schematic exploded view illustrating a portion of the projection module of the input device as shown in FIG. 9. Except for the following aspects, the components of the input device of this embodiment are substantially identical to those of the first embodiment. In addition, the input device is also a mouse device. In comparison with the first embodiment, the projection module 23B of this embodiment further comprises a second lens 235. The projection plate 233 is arranged between the first lens 232 and the second lens 235. In addition, the projection plate 233 is separated from the first lens 232 and the second lens 235. After the plural light beams L2 pass through the projection plate 233, the plural light beams L2 pass through the second lens 235. Consequently, the travelling directions of at least portions of the light beams L2 are changed. In this embodiment, the first lens 232 and the second lens 235 are concave-convex lenses. It is noted that the types of the first lens 232 and the second lens 235 are not restricted. For example, in another embodiment, at least one of the first lens 232 and the second lens 235 is a plano-convex lens.

Figure 11:
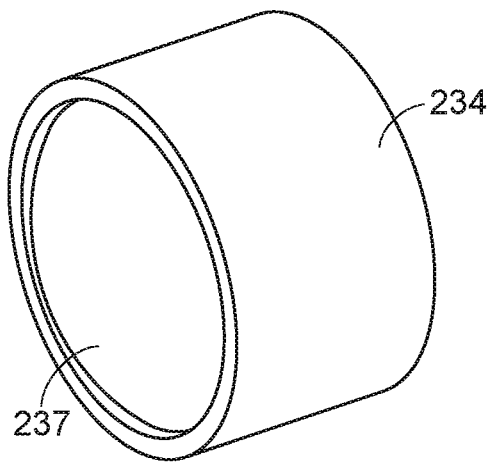
FIG. 11 is a schematic perspective view illustrating a projection module of an input device according to a third embodiment of the present invention.
Figure 12:
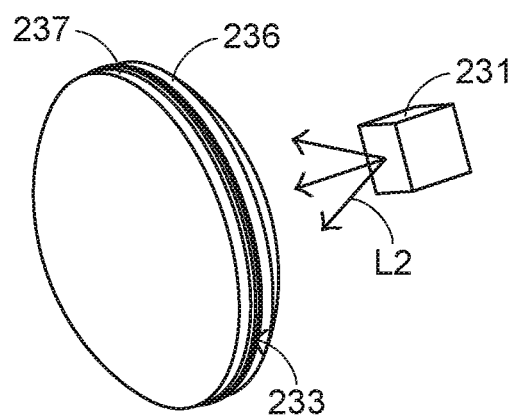
FIG. 12 is a schematic exploded view illustrating a portion of the projection module of the input device as shown in FIG. 11.

Please refer to FIGS. 11 and 12. FIG. 11 is a schematic perspective view illustrating a projection module of an input device according to a third embodiment of the present invention. FIG. 12 is a schematic exploded view illustrating a portion of the projection module of the input device as shown in FIG. 11. Except for the following aspects, the components of the input device of this embodiment are substantially identical to those of the second embodiment. In this embodiment, the first lens 236 and the second lens 237 of the projection module 23C are plano-convex lenses. Moreover, the projection plate 233 is sandwiched between the first lens 236 and the second lens 237. The two opposite surfaces of the projection plate 233 are contacted with the first lens 236 and the second lens 237, respectively. This design can reduce the overall volume of the projection module 23C. The reduced volume of the projection module 23C is helpful to the development of the input device toward light weightiness, slimness and small size. It is noted that the types of the first lens 236 and the second lens 237 are not restricted. For example, in another embodiment, at least one of the first lens 236 and the second lens 237 is a concave-convex lens.

From the above descriptions, the input device of the present invention is equipped with the light source 231 and the projection plate 233 having the pattern 2331. Consequently, the input device of the present invention has the function of projecting the image corresponding to the pattern 2331. Since the projection plate 233 is cheap and small, the fabricating cost of the input device is reduced and the purpose of developing the input device toward light weightiness, slimness and small size is achievable. It is noted that numerous modifications and alterations may be made while retaining the teachings of the invention.

For example, in some embodiments, the projection module 23A, 23B or 23C is not equipped with any lens. Under this circumstance, the light beams L2 outputted from the light source 231 are directly transmitted through the projection plate 233 and projected outside the casing 22. In the above embodiments, the input device is the mouse device. It is noted that numerous modifications and alterations may be made while retaining the teachings of the invention. For example, in another embodiment, the input device is a keyboard device with the function of projecting the image corresponding to the pattern. In some other embodiments, the projection plate is arranged between the light source and the first lens.

Figure 13:
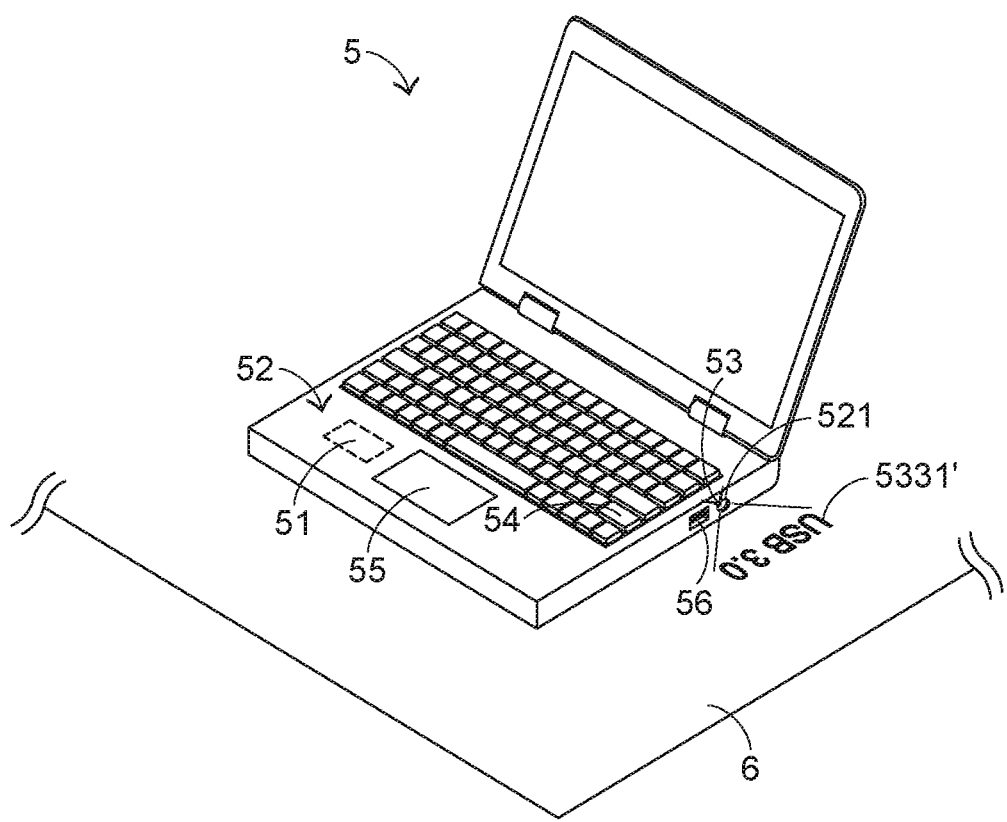
FIG. 13 is a schematic perspective view illustrating the outward appearance of a computing device according to an embodiment of the present invention.

FIG. 13 is a schematic perspective view illustrating the outward appearance of a computing device according to an embodiment of the present invention. In this embodiment, the computing device 5 is a notebook computer. The notebook computer comprises a control unit 51, a casing 52 and a projection module 53. The control unit 51 and the projection module 53 are accommodated within the casing 52. The casing 52 comprises a light-transmissible part 521 corresponding to the projection module 53. Preferably but not exclusively, the light-transmissible part 521 is a perforation or a transparent structure for allowing the light beam to pass through. Moreover, the computing device 5 further comprises a keyboard 54 or a touchpad 55 to be operated by the user. When the user operates the keyboard 54 or the touchpad 55, the control unit 51 generates a control signal to control the computing device 5.

Figure 14:
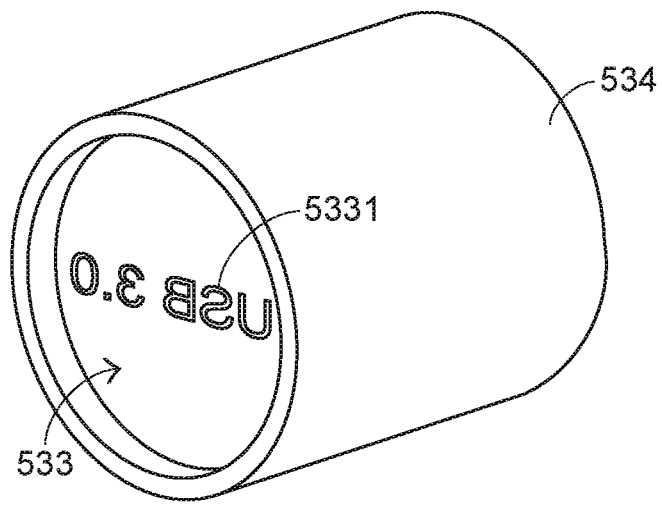
FIG. 14 is a schematic perspective view illustrating the projection module of the computing device as shown in FIG. 13.
Figure 15:
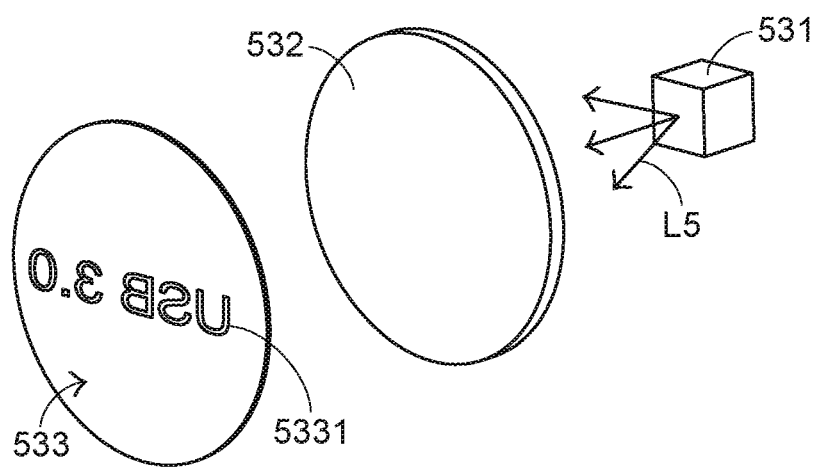
FIG. 15 is a schematic exploded view illustrating a portion of the projection module of the computing device as shown in FIG. 14.

Please refer to FIGS. 14 and 15. FIG. 14 is a schematic perspective view illustrating the projection module of the computing device as shown in FIG. 13. FIG. 15 is a schematic exploded view illustrating a portion of the projection module of the computing device as shown in FIG. 14. In this embodiment, the projection module 53 comprises a light source 531, a first lens 532, a projection plate 533 and a fixing element 534. The first lens 532 is arranged between the light source 531 and the projection plate 533. The fixing element 534 is used for fixing the first lens 532 and the projection plate 533. The light source 531 emits plural light beams L5. When the light beams L5 outputted from the light source 531 pass through the first lens 532, the travelling directions of at least portions of the light beams L5 are changed. In an embodiment, the first lens 532 is a concave-convex lens or a plano-convex lens, and the fixing element 534 is a sleeve for fixing the first lens 532 and the projection plate 533 therein. It is noted that the type of the first lens 532, the type of the fixing element 534 and the way of fixing the first lens 532 and the projection plate 533 are not restricted.

The projection plate 533 has a pattern 5331. For example, the projection plate 533 is a film. The pattern 5331 on the projection plate 533 indicates the information to be displayed. The pattern 5331 is formed on the film through a printing process or a developing process. The way of forming the pattern 5331 is well known to those skilled in the art, and is not redundantly described herein.

The projecting operations of the computing device 5 will be described as follows. After the light beams L5 outputted from the light source 531 pass through the first lens 532, the light beams L5 pass through the projection plate 533. After the light beams L5 pass through the projection plate 533, the light beams L5 are projected outside the casing 52. Consequently, the image 5331' corresponding to the pattern 5331 is formed on a projection surface 6 that is located outside the casing 52. Preferably but not exclusively, the projection surface 6 is a desk surface where the computing device 5 is placed.

In this embodiment, the computing device 5 further comprises a connecting port 56. For example, the image corresponding to the pattern 5331 on the projection plate 533 indicates the information about the connecting port 56. In case that the connecting port 56 is a USB3.0 connecting port, the image corresponding to the pattern 5331 on the projection plate 533 indicates the information "USB3.0". The image 5331' corresponding to the pattern 5331 is projected outside the casing 52 and formed on the projection surface 6 (e.g., a desk surface). The image 5331' on the projection surface 6 (e.g., the desk surface) indicates the information "USB3.0" near the connecting port 56. Consequently, the projected image 5331' is helpful for the user to recognize the connecting port 56. Preferably but not exclusively, when the connecting port 56 is being used, the light source 531 stops emitting the light beams L5 under control of the control unit 51. That is, the projecting function is disabled. Consequently, the power-saving efficacy is enhanced.

The focal distance, the size of the image 5331' on the projection surface 6 or any other appropriate image effect may be determined according to the optical data of the first lens 532 and/or the distance relationship between the first lens 532, the projection plate 533 and the light source 531. The distance relationship between the first lens 532, the projection plate 533 and the light source 531 may be specially designed by those skilled in the art according to the practical requirements. For example, the projection module 53 as shown in FIG. 14 is further modified. Each of the projection modules 23B and 23C with the two lenses (see FIG. 9 and FIG. 11) is suitably used as the projection module of the computing device. Alternatively, in another embodiment, the projection module is not equipped with any lens. Under this circumstance, the light beams L5 outputted from the light source 531 are directly transmitted through the projection plate 533 and projected outside the casing 52. In this embodiment, the first lens 532 is arranged between the light source 531 and the projection plate 533. It is noted that numerous modifications and alterations may be made while retaining the teachings of the invention. For example, in another embodiment, the projection plate is arranged between the light source and the first lens.

From the above descriptions, the computing device 5 of the present invention is equipped with the light source 531 and the projection plate 533 having the pattern 5331. Consequently, the input device of the present invention has the function of projecting the image corresponding to the pattern 5331. Since the projection plate 533 is cheap and small, the fabricating cost of the computing device 5 is reduced and the purpose of developing the computing device 5 toward light weightiness, slimness and small size is achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An input device, comprising:
a control unit in communication with a computing device, wherein when the input device is operated by a user, the control unit generates a control signal to the computing device;
a light source emitting plural light beams;
a projection plate comprising a pattern;
a casing, wherein the control unit, the light source and the projection plate are accommodated within the casing; and
a connecting port,
wherein after the plural light beams are transmitted through the projection plate, an image corresponding to the pattern is projected outside the casing and formed on a projection surface that is located outside the casing, and wherein the image formed on the projection surface indicates an information about the connecting port.

2. The input device according to claim 1, further comprising a first lens, wherein when the plural light beams pass through the first lens, travelling directions of at least portions of the plural light beams are changed, wherein the first lens is arranged between the light source and the projection plate, or the projection plate is arranged between the light source and the first lens.

3. The input device according to claim 2, further comprising a second lens, wherein when the plural light beams pass through the second lens, travelling directions of at least portions of the plural light beams are changed, wherein the projection plate is arranged between the first lens and the second lens.

4. The input device according to claim 3, wherein the projection plate is sandwiched between the first lens and the second lens, and the first lens and the second lens are contacted with the projection plate.

5. The input device according to claim 1, wherein the projection plate is a film.

6. The input device according to claim 5, wherein the pattern is formed on the film through a printing process or a developing process.

7. The input device according to claim 1, wherein the projection surface is a desk surface where the input device is placed.

8. The input device according to claim 1, wherein the input device is a mouse device or a keyboard device.

9. A computing device, comprising: a control unit, wherein when the computing device is operated by a user, the control unit generates a control signal to the computing device; a light source emitting plural light beams; a projection plate comprising a pattern; a casing, wherein the control unit, the light source and the projection plate are accommodated within the casing; and a connecting port, wherein after the plural light beams are transmitted through the projection plate, an image corresponding to the pattern is projected outside the casing and formed on a projection surface that is located outside the casing, and wherein the image formed on the projection surface indicates an information about the connecting port.

10. The computing device according to claim 9, wherein when the connecting port is being used, the light source stops emitting the plural light beams under control of the control unit.

11. The computing device according to claim 9, further comprising a first lens, wherein when the plural light beams pass through the first lens, travelling directions of at least portions of the plural light beams are changed, wherein the first lens is arranged between the light source and the projection plate, or the projection plate is arranged between the light source and the first lens.

12. The computing device according to claim 11, further comprising a second lens, wherein when the plural light beams pass through the second lens, travelling directions of at least portions of the plural light beams are changed, wherein the projection plate is arranged between the first lens and the second lens.

13. The computing device according to claim 12, wherein the projection plate is sandwiched between the first lens and the second lens, and the first lens and the second lens are contacted with the projection plate.

14. The computing device according to claim 9, wherein the projection plate is a film.

15. The computing device according to claim 14, wherein the pattern is formed on the film through a printing process or a developing process.

16. The computing device according to claim 9, wherein the projection surface is a desk surface where the computing device is placed.

17. The computing device according to claim 9, wherein the computing device is a notebook computer.

* * * * *